United States Patent
Swann et al.

(10) Patent No.: US 6,612,611 B1
(45) Date of Patent: Sep. 2, 2003

(54) DOOR MOUNTED INFLATABLE TUBULAR STRUCTURE

(75) Inventors: Timothy A. Swann, Mesa, AZ (US); Dan Lohavanijaya, Chandler, AZ (US)

(73) Assignees: TRW Inc., Lyndhurst, OH (US); Simula Inc., Tempe, AZ (US)

( * ) Notice: Subject to any disclaimer, the term of this patent is extended or adjusted under 35 U.S.C. 154(b) by 0 days.

(21) Appl. No.: 09/650,201

(22) Filed: Aug. 29, 2000

(51) Int. Cl.[7] ............................................... B60R 21/22
(52) U.S. Cl. ................................ 280/730.2; 280/730.1; 280/729; 280/753
(58) Field of Search ......................... 280/730.2, 730.1, 280/753, 743.1, 743.2, 729

(56) References Cited

U.S. PATENT DOCUMENTS

| | | | |
|---|---|---|---|
| 5,265,903 A | | 11/1993 | Kuretake et al. |
| 5,322,322 A | | 6/1994 | Bark et al. |
| 5,333,899 A | * | 8/1994 | Witte .......................... 280/730 |
| 5,480,181 A | | 1/1996 | Bark et al. |
| 5,605,346 A | | 2/1997 | Cheung et al. |
| 5,707,075 A | | 1/1998 | Kraft et al. |
| 5,718,449 A | * | 2/1998 | Numazawa et al. ..... 280/730.2 |
| 5,752,713 A | | 5/1998 | Matsuura et al. |
| 5,797,621 A | * | 8/1998 | Ono .......................... 280/730.2 |
| 5,865,462 A | * | 2/1999 | Robins et al. ........... 280/730.2 |
| 5,868,421 A | | 2/1999 | Eyrainer |
| 5,941,564 A | | 8/1999 | Acker |
| 6,179,323 B1 | * | 1/2001 | Schellabarger ........... 280/730.1 |

FOREIGN PATENT DOCUMENTS

| | | |
|---|---|---|
| DE | 195 47 494 A1 | 7/1997 |
| DE | 198 43 111 A1 | 3/2000 |

* cited by examiner

*Primary Examiner*—Kenneth R. Rice
*Assistant Examiner*—Christopher Buchanan
(74) *Attorney, Agent, or Firm*—Tarolli, Sundheim Covell & Tummino L.L.P.

(57) ABSTRACT

Apparatus (10) for helping to protect an occupant of a vehicle (12) that has a side structure (16) including a side door (18) includes an inflatable tubular structure (14) and an inflation fluid source (34) for providing inflation fluid for inflating the inflatable tubular structure. The inflatable tubular structure (14) has a stored position in which the inflatable tubular structure is deflated and stored in the side door (18). The inflatable tubular structure (14) is inflatable from the stored position to a deployed position in which the inflatable tubular structure is inflated and positioned between the side structure (16) of the vehicle (12) and a vehicle occupant.

9 Claims, 5 Drawing Sheets

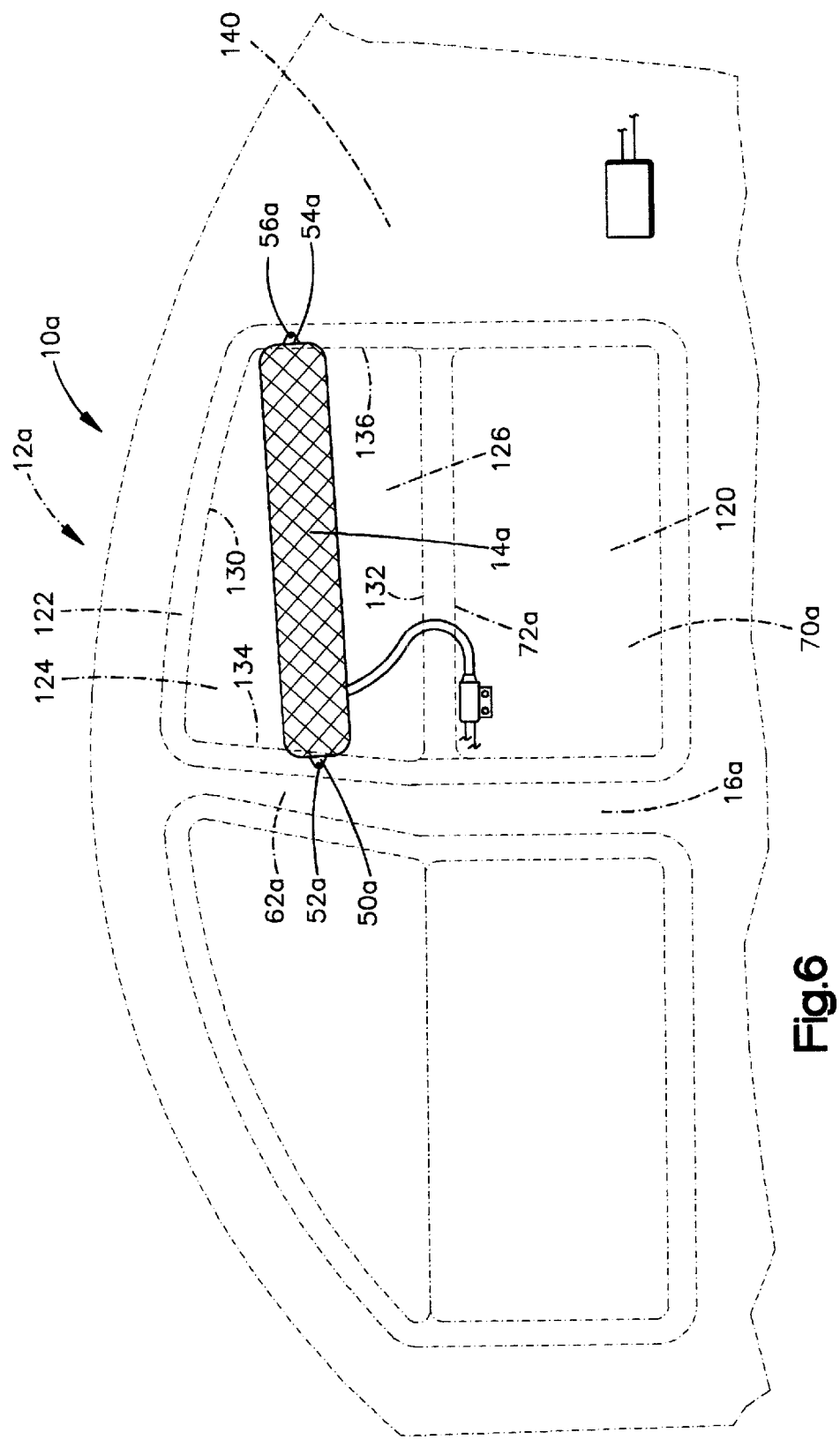

DOOR MOUNTED INFLATABLE TUBULAR STRUCTURE

FIELD OF THE INVENTION

The present invention relates to an inflatable apparatus for helping to protect an occupant of a vehicle in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable tubular structure that is inflatable inside the passenger compartment of a vehicle between a vehicle occupant and the side structure of the vehicle in the event of a side impact or rollover. A known inflatable tubular structure is inflated from a stored position by inflation fluid directed from an inflator to the inflatable tubular structure through a fill tube.

SUMMARY OF THE INVENTION

The present invention relates to an apparatus for helping to protect an occupant of a vehicle that has a side structure including a side door. The apparatus comprises an inflatable tubular structure and an inflation fluid source for providing inflation fluid to inflate the inflatable tubular structure. The inflatable tubular structure has a first end connected to the side door of the vehicle at a first location and an opposite second end connected to the side door at a second location. The inflatable tubular structure has a stored position in which the inflatable tubular structure is deflated and stored in the side door. The inflatable tubular structure is inflatable from the stored position to a deployed position in which the inflatable tubular structure is inflated and positioned between the side structure of the vehicle and a vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 6 is a schematic view of the apparatus of FIG. 5 in an deployed position.

DESCRIPTION OF PREFERRED EMBODIMENTS

Figure 1:
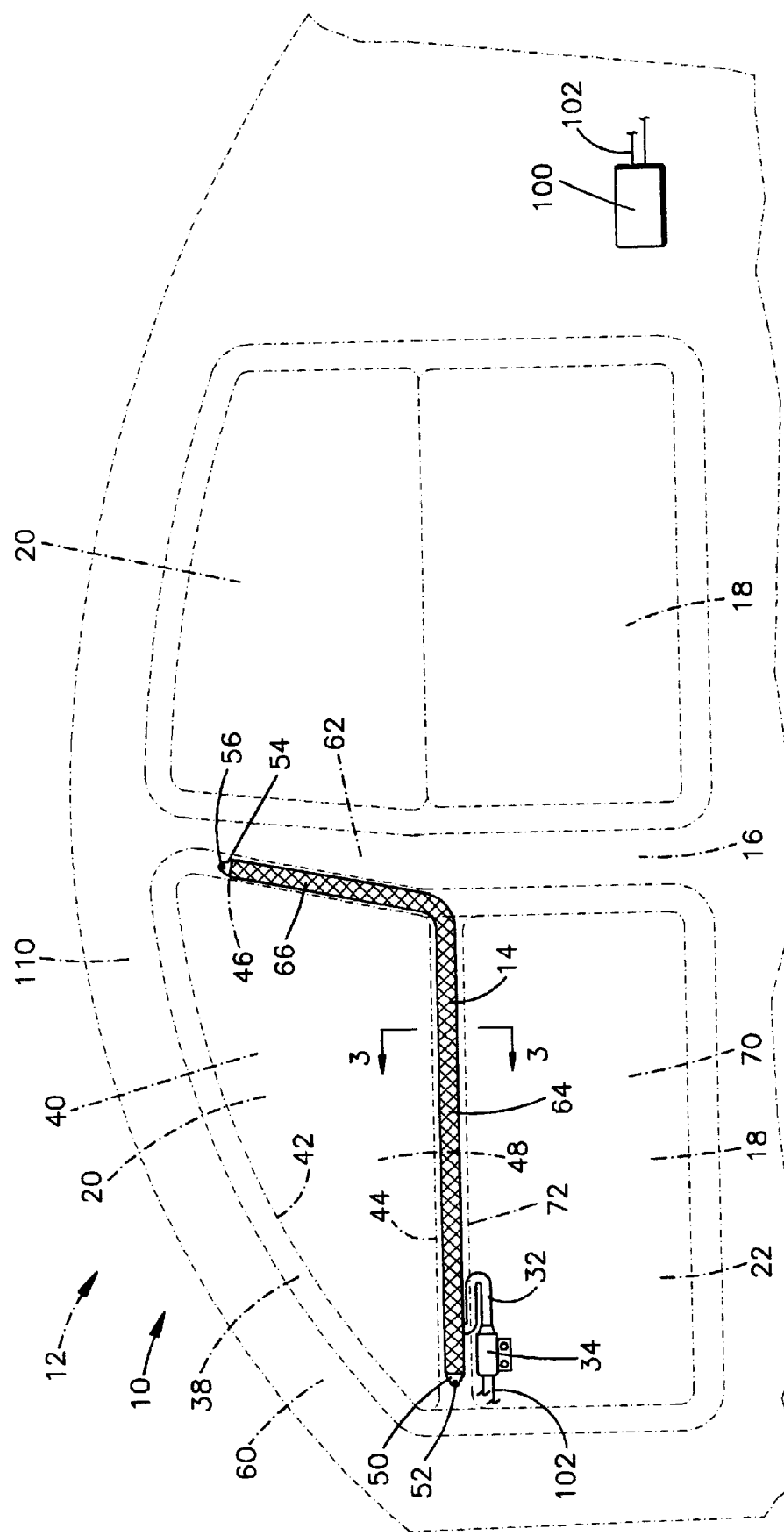
FIG. 1 is a schematic view of an inflatable apparatus for helping to protect an occupant of a vehicle illustrating the apparatus in a stored position.
Figure 2:
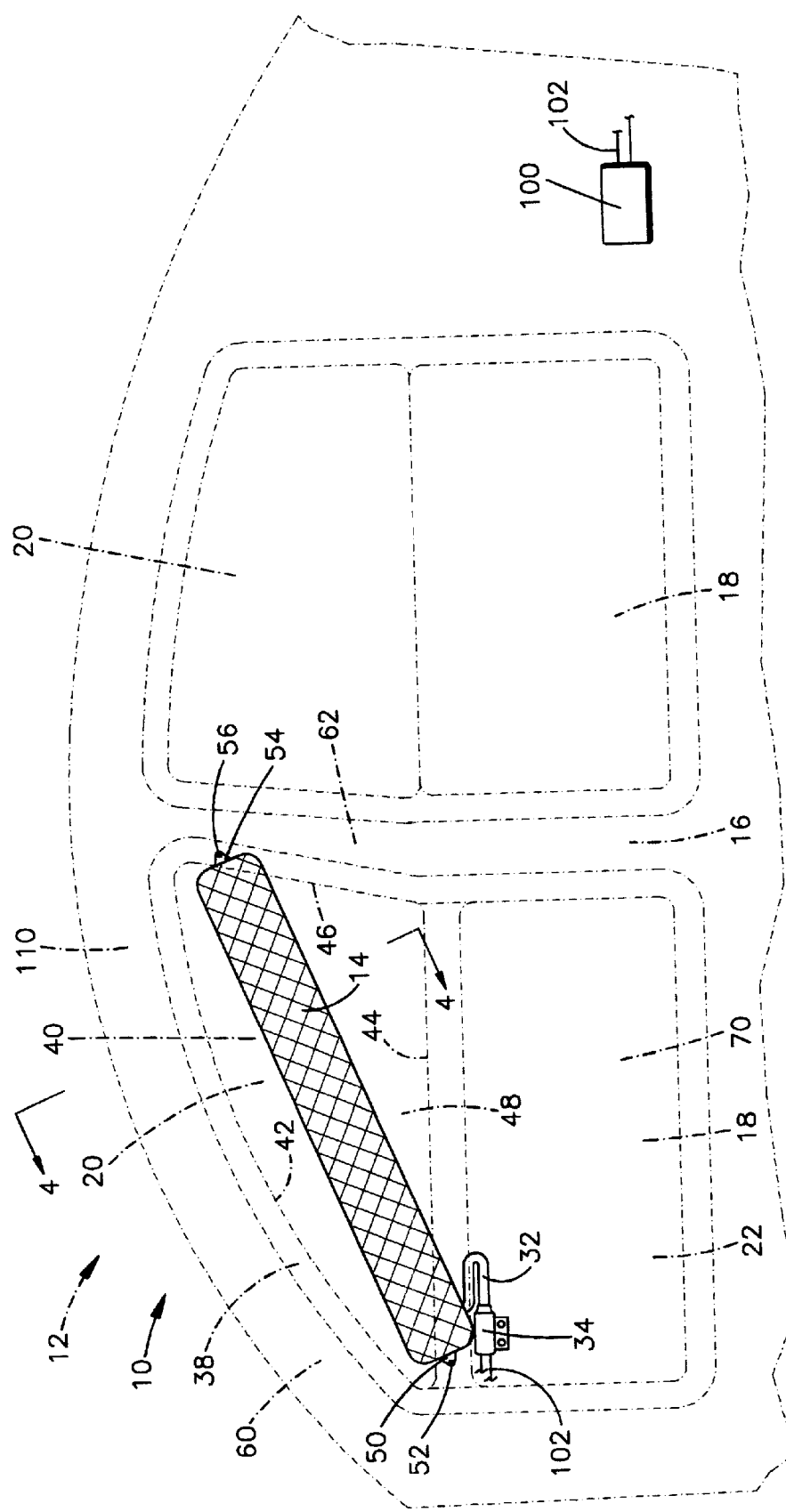
FIG. 2 is a schematic view of the apparatus of FIG. 1 in an deployed position.

As representative of the present invention, an apparatus 10 helps to protect an occupant of a vehicle 12 that has a side structure 16. The side structure 16 includes side doors 18 that include side windows 20. As shown in FIGS. 1 and 2, the apparatus 10 includes an inflatable vehicle occupant protection device in the form of an inflatable tubular structure 14 that is mounted on a front side door 22 of the vehicle adjacent a front side window 20 of the vehicle. The front side door 22 may be on a driver side or a passenger side of the vehicle 12.

An inflator 34 is connected in fluid communication with the inflatable tubular structure 14 through a fill tube 32. It will be recognized by those skilled in the art that the fill tube 32 may be omitted, in which case the inflator 34 would be connected directly to the inflatable tubular structure 14. The inflator 34 contains a stored quantity of pressurized inflation fluid (not shown) in the form of a gas to inflate the inflatable tubular structure 14. The inflator 34 alternatively could contain a combination of pressurized inflation fluid and ignitable material for heating the inflation fluid, or could be a pyrotechnic inflator that uses the combustion of gas-generating material to generate inflation fluid. As a further alternative, the inflator 34 could be of any suitable type or construction for supplying a medium for inflating the inflatable tubular structure 14.

The front side door 22 includes a frame portion 38 that helps to define a window opening 40 in which the front side window 48 is located. The window opening 40 includes an upper edge 42, an opposite lower edge 44, and a rear edge 46 that extends between the upper and lower edges. The frame portion 38 defines the upper edge 42 and the rear edge 46 of the window opening 40. As illustrated in FIGS. 1 and 2, the upper edge 42 is curved and extends until it intersects the lower edge 44. It will be recognized by those skilled in the art, however, that the window opening 40 could include a front edge spaced apart horizontally from the rear edge 46 and extending between the upper and lower edges 42 and 44. In that case, the upper edge would not intersect the lower edge.

The inflatable tubular structure 14 has a first end 50 connected to the front side door 22 at a first location 52 on the door and an opposite second end 54 connected to the front side door at a second location 56 on the door. In the embodiment illustrated in FIGS. 1 and 2, the first location 52 is positioned adjacent the intersection of the upper edge 42 and the lower edge 44 of the window opening 40, near an A pillar 60 of the vehicle 12. The second location 56 is positioned adjacent the rear edge 46 of the window opening 40, near a B pillar 62 of the vehicle 12. The second location 56 may be positioned near the intersection of the upper edge 42 and the rear edge 46 of the window opening 40.

The inflatable tubular structure 14 has a stored position (FIG. 1) in which the inflatable tubular structure is deflated and stored. In the stored position, the inflatable tubular structure 14 has a portion 64 that extends along the window opening 40 adjacent along the lower edge 44 of the opening, and a portion 62 that extends along the frame portion 38 adjacent the rear edge 46 of the window opening.

Figure 3:
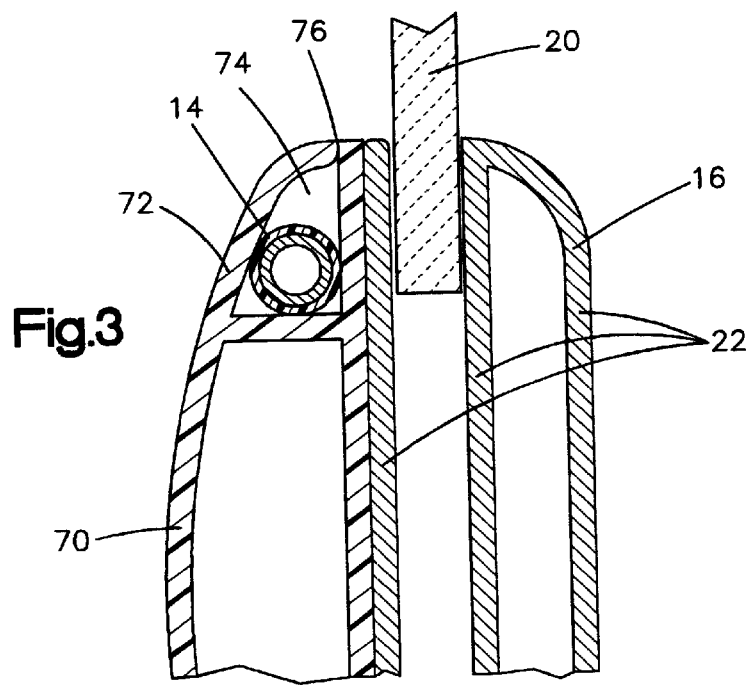
FIG. 3 is a sectional view of the apparatus of FIG. 2 taken generally along line 3—3 in FIG. 1.

The front side door 22 includes a door panel 70 that helps to store the inflatable tubular structure 14 when the inflatable tubular structure is in the stored position. As illustrated in FIG. 3, the door panel 70 includes a housing portion 72 that defines an area 74 for storing at least a portion of the inflatable tubular structure 14 in the stored position. The housing portion 72 may include a tear seam 76.

The portion 64 of the inflatable tubular structure 14 (FIG. 1) extending adjacent the lower edge 44 of the window opening 40 is stored in the housing portion 72 of the door panel 70. The portion 66 of the inflatable tubular structure 14 extending along the frame portion 38 adjacent the rear edge 46 of the window opening 40 may be concealed behind a trim piece (not shown) of the door 22. The trim piece may be a part of the door panel 70 that extends along the frame portion 38 of the door 22 adjacent the rear edge 46 of the window opening 40. Alternatively, the portion 66 of the inflatable tubular structure 14 could be concealed within the frame portion 38 of the door 22 adjacent the rear edge 46 of the window opening 40.

Figure 4:
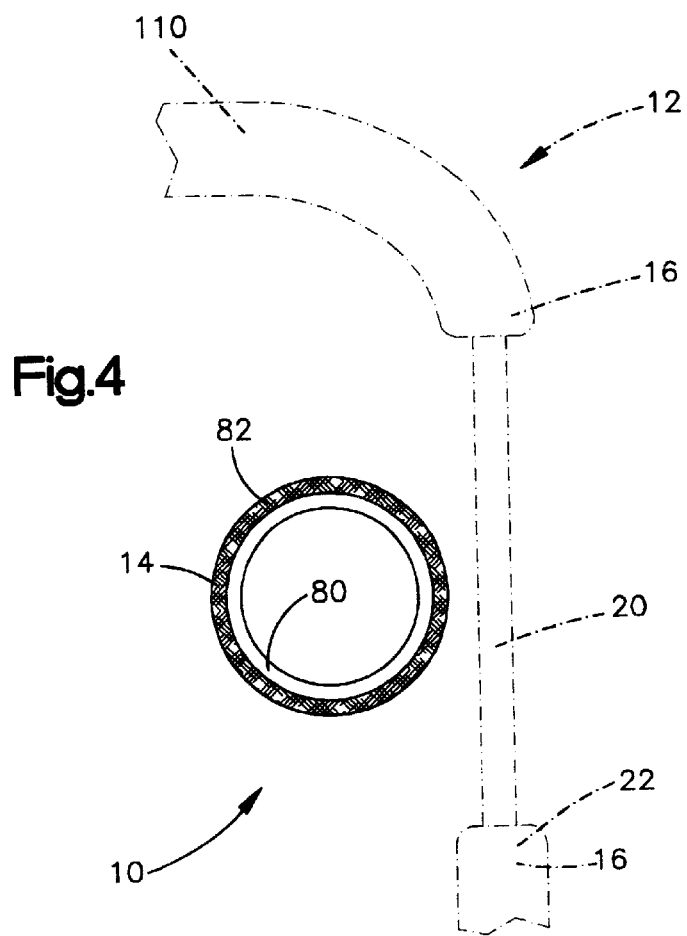
FIG. 4 is a sectional view of the apparatus of FIG. 2 taken generally along line 4—4 in FIG. 2.

As illustrated in FIG. 4, the inflatable tubular structure 14 comprises an inflatable bladder 80 and a generally tubular outer shell 82 that at least partially surrounds the inflatable bladder. The inflatable bladder 80 is preferably constructed of a material, such as an elastic polymer, that is generally gas impermeable and that is capable of expanding and conforming to the size and shape of the outer shell 82. The fill tube (not shown in FIG. 4) is in fluid communication with the inflatable bladder 80. The outer shell 82 is preferably constructed of a braided material, such as braided fabric.

The vehicle 12 includes a sensor mechanism 100 (shown schematically in FIGS. 1 and 2) for sensing a side impact to the vehicle 12 and/or a rollover of the vehicle 12. The sensor mechanism 100 actuates the inflator 34 in response to the sensing of a side impact or a vehicle rollover.

In the event of a rollover of the vehicle 12 or a side impact to the vehicle of a magnitude greater than a predetermined threshold value, the sensor mechanism 100 provides an electrical signal over lead wires 102 to the inflator 34. The electrical signal causes the inflator 34 to be actuated in a known manner. The inflator 34 discharges fluid under pressure into the fill tube 32. The fill tube 32 directs the fluid into the inflatable tubular structure 14.

The inflatable tubular structure 14 inflates under the pressure of the inflation fluid from the inflator 34. The housing 72 (FIG. 3) opens open along the tear seam 76 and the inflatable tubular structure 14 moves in a generally upward direction as shown in FIGS. 1 and 2 towards a roof 110 of the vehicle 12. The inflatable tubular structure 14, when inflated, moves to the deployed position illustrated in FIG. 2.

As the inflatable tubular structure 14 is inflated, the diameter of the outer shell 82 increases and the length of the outer shell decreases. As the inflatable tubular structure 14 is inflated and the length of the outer shell 82 begins to decrease, the inflatable tubular structure becomes tensioned between the first and second locations 52 and 56. The inflatable tubular structure 14 is moved from the stored position of FIG. 1 to the deployed position of FIG. 2 by the tensioning of the inflatable tubular structure. When the inflatable tubular structure 14 is in the deployed position, the tension helps to maintain the inflatable tubular structure positioned adjacent the vehicle side structure 16 between the side structure and any occupant of the vehicle 12.

The inflatable tubular structure 14 (FIG. 2), when in the deployed position, extends along the side structure 16 of the vehicle 12 adjacent the window opening 40. The inflated inflatable tubular structure 14 is positioned between the side structure 16 and any occupant of the vehicle 12. The inflatable tubular structure 14 extends from a location near the A pillar 60 to a location near the B pillar 62 of the vehicle 12.

The inflatable tubular structure 14, when inflated, helps to protect a vehicle occupant in the event of a vehicle rollover or a side impact to the vehicle 12. The inflated inflatable tubular structure 14 helps to absorb the energy of impacts with the tubular structure and helps to distribute the impact energy over a large area of the inflatable tubular structure. When the inflatable tubular structure 14 is in the deployed position illustrated in FIG. 2, portions of the inflatable tubular structure may be positioned adjacent the vehicle side structure 16 at locations where an occupant's head is likely to strike the side structure in the event of a side impact or vehicle rollover.

Figure 5:
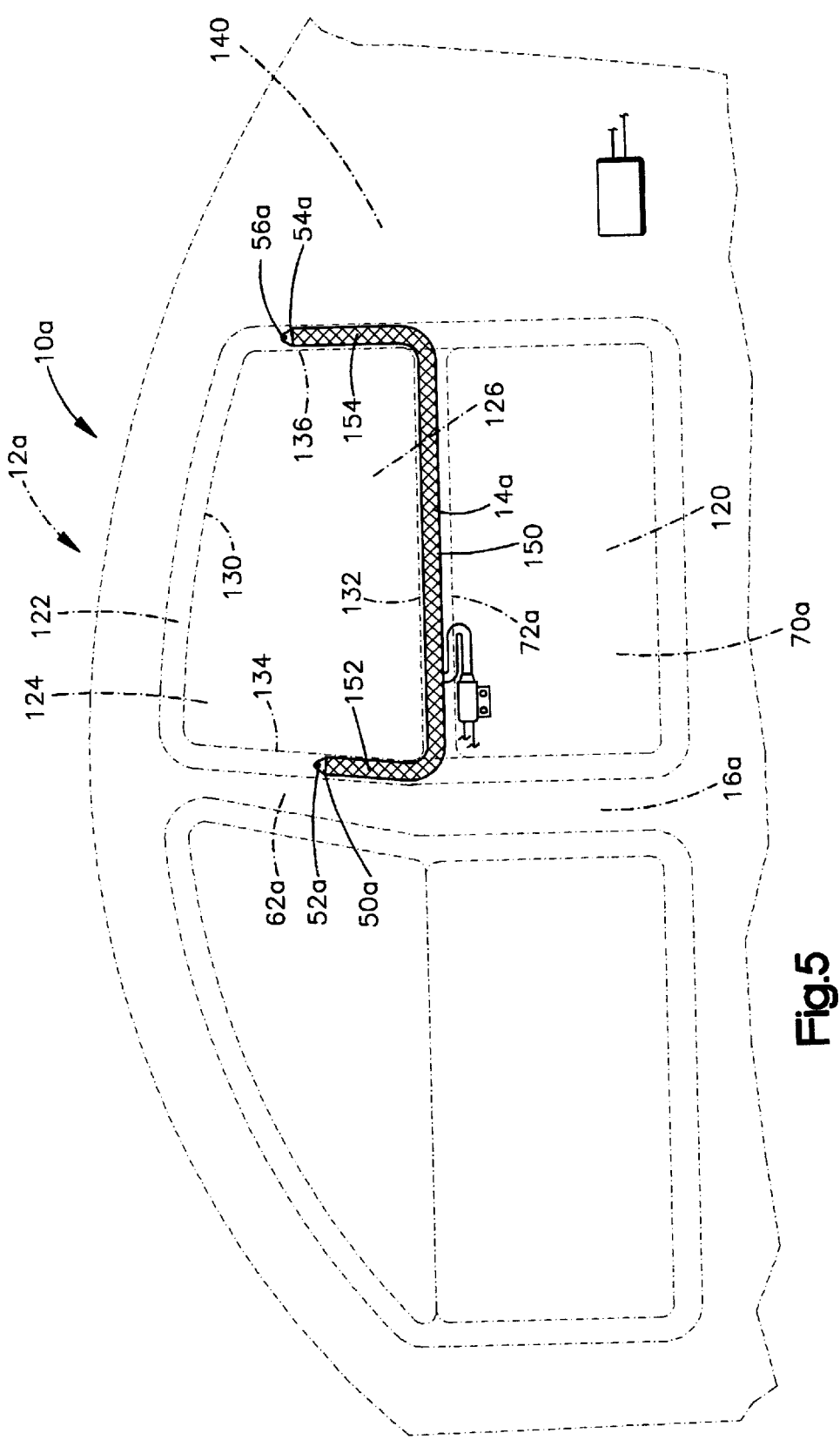
FIG. 5 is a schematic view an apparatus for helping to protect an occupant of a vehicle illustrating the apparatus in a stored position, according to a second embodiment of the invention.

A second embodiment of the present invention is illustrated in FIGS. 5 and 6. The second embodiment of the invention is similar to the first embodiment of the invention illustrated in FIGS. 1–4. Accordingly, numerals similar to those of FIGS. 1–4 will be utilized in FIGS. 5 and 6 to identify similar components, the suffix letter "a" being associated with the numerals of FIGS. 5 and 6 to avoid confusion. The apparatus 10a (FIGS. 5 and 6) of the second embodiment is identical to the apparatus 10 (FIGS. 1–4), except that the inflatable tubular structure 14a (FIGS. 5 and 6) of the second embodiment is connected to a rear side door 120 instead of the front side door 22 (FIGS. 1–4). The rear side door 120 (FIGS. 5 and 6) may be on a driver side or a passenger side of the vehicle 12a.

As illustrated in FIGS. 5 and 6, the rear side door 120 includes a frame portion 122 that helps to define a window opening 124 in which a rear side window 126 is located. The window opening 124 includes an upper edge 130, an opposite lower edge 132, and front and rear edges 134 and 136, respectively, that are spaced apart horizontally and extend between the upper and lower edges.

The inflatable tubular structure 14a has a first end 50a connected to the rear side door 120 of the vehicle 12a at a first location 52a on the frame portion 122 of the side door and an opposite second end 54a connected to the side door at a second location 56a on the frame portion of the side door. As illustrated in FIGS. 5 and 6, the first location 52a is positioned adjacent the intersection of the front edge 134 and the lower edge 132 of the window opening 124, near the B pillar 62a of the vehicle 12a. The second location 56a is positioned adjacent the rear edge 136 of the window opening 124, near a C pillar 140 of the vehicle 12a. The second location 56a may be positioned near the intersection of the upper edge 130 and the rear edge 136 of the window opening 124.

In the stored position of FIG. 5, the inflatable tubular structure 14a has a portion 150 that extends along the window opening 124 adjacent the lower edge 132 of the window opening 124. The inflatable tubular structure 14a also has a portion 152 that extends along the frame portion 122 adjacent the front edge 134 of the window opening, and a portion 154 that extends along the frame portion adjacent the rear edge 136 of the window opening. The portion 150 of the inflatable tubular structure 14a (FIG. 5) extending adjacent the lower edge 132 of the window opening 124 is stored in the housing portion 72a of the door panel 70a. The portions 152 and 154 of the inflatable tubular structure 14a may be concealed behind a trim piece (not shown) of the rear side door 120. The trim pieces may be parts of the door panel 70a that extend along the frame portion 122 of the door 120 adjacent the front and rear edges 134 and 136 of the window opening 124. Alternatively, the portions 152 and 154 could be concealed within the frame portion 122 of the rear side door 120 along the front and rear edges 134 and 136, respectively, of the window opening 124.

The inflatable tubular structure 14a (FIG. 6), when inflated, extends along the side structure 16a of the vehicle 12a adjacent the window opening 124. The inflated inflatable tubular structure 14a is positioned between the side structure 16a and any occupant of the vehicle 12a. The inflatable tubular structure 14a extends from a location near the B pillar 62a to a location near the C pillar 140 of the vehicle 12a.

The inflatable tubular structure 14a, when inflated, helps to protect a vehicle occupant in the event of a vehicle rollover or a side impact to the vehicle 12a. The inflatable tubular structure 14a, when inflated, helps to absorb the energy of impacts with the tubular structure and helps to distribute the impact energy over a large area of the inflatable tubular structure. When the inflatable tubular structure 14a is in the deployed position illustrated in FIG. 6, portions of the inflatable tubular structure may be positioned adjacent the vehicle side structure 16a at locations where an occupant's head is likely to strike the side structure in the event of a side impact or vehicle rollover.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure including a side door, the side door including a frame portion defining a window opening, said apparatus comprising:

an inflatable tubular structure having a first end connected to the side door at a first location adjacent a lower edge of the window opening and an opposite second end connected to the side door at a second location adjacent a rear edge of the window opening, said inflatable tubular structure having a deflated and stored condition wherein a first portion of said inflatable tubular structure extends from said first location in a generally horizontal and rearward direction inside the side door along the lower edge of the window opening to the rear edge of the window opening and a second portion of said inflatable tubular structure extends from said second end in a generally vertical and downward direction inside the frame portion along the rear edge of the window opening to the lower edge of the window opening, said first and second portions intersecting adjacent an intersection of the lower edge and rear edge of the window opening; and an inflation fluid source for providing inflation fluid to inflate said inflatable tubular structure, said inflatable tubular structure including a tubular outer shell constructed of a braided fabric material, said outer shell having a diameter that increases and a length that decreases when said inflatable tubular structure is inflated, said outer shell being tensioned between said first and second locations on the side door when said length decreases and said inflatable tubular structure deploys from said deflated and stored condition in a generally upward direction to an inflated condition between the side door and a vehicle occupant, said inflatable tubular structure when in said inflated condition overlying the vehicle side door and being free from any portions that overlie parts of the vehicle other than the side door.

2. Apparatus as defined in claim 1, wherein said first location is near a forward extent of the lower edge of the window opening and said second location is near an upper extent of the rear edge of the window opening.

3. Apparatus as defined in claim 1, wherein the side door includes a door panel including a housing portion extending along the lower edge of the window opening from the forward extent of the lower edge to the rear edge of the window opening, said first portion of said inflatable tubular structure being positioned in said housing portion when said inflatable tubular structure is in said stored position, said inflatable tubular structure being adapted to open said housing portion when said inflatable tubular structure moves from said stored position to said deployed position.

4. Apparatus as defined in claim 1, wherein the side door is a front side door of the vehicle, said first location being located on the front side door adjacent an A pillar of the vehicle, said second location being located on the front side door adjacent a B pillar of the vehicle.

5. Apparatus as defined in claim 1, wherein said inflatable tubular structure further comprises an inflatable bladder constructed of a gas impermeable material, said outer shell surrounding said inflatable bladder.

6. Apparatus for helping to protect an occupant of a vehicle that has a side structure including a side door including a frame portion defining a window opening, said apparatus comprising:

an inflatable tubular structure having a first end connected to the side door at a first location adjacent a forward edge of the window opening and an opposite second end connected to the side door at a second location adjacent a rear edge of the window opening, said inflatable tubular structure having a deflated and stored condition wherein a first portion of said inflatable tubular structure extends from said first location in a vertical direction inside the frame portion along the forward edge of the window opening to a lower edge of the window opening, a second portion of said inflatable tubular structure extending from in a generally horizontal direction inside the side door along the lower edge of the window opening from the forward edge to the rear edge of the window opening, and a third portion of said inflatable tubular structure extending from said second end in a generally vertical and downward direction inside the frame portion along the rear edge of the window opening to the lower edge of the window opening, said first and second portions intersecting adjacent an intersection of the lower edge and forward edge of the window opening, said second and third portions intersecting adjacent an intersection of the lower edge and rear edge of the window opening; and an inflation fluid source for providing inflation fluid to inflate said inflatable tubular structure, said inflatable tubular structure including a tubular outer shell constructed of a braided fabric material, said outer shell having a diameter that increases and a length that decreases when said inflatable tubular structure is inflated, said outer shell being tensioned between said first and second locations on the side door when said length decreases and said inflatable tubular structure deploys from said deflated and stored condition in a generally upward direction to an inflated condition between the side door and a vehicle occupant, said inflatable tubular structure when in said inflated condition overlying the vehicle side door and being free from any portions that overlie parts of the vehicle other than the side door.

7. Apparatus as defined in claim 6, wherein the side door includes a door panel including a housing portion extending along the lower edge of the window opening from the forward edge of the window opening to the rear edge of the window opening, said second portion of said inflatable tubular structure being positioned in said housing portion when said inflatable tubular structure is in said stored position, said inflatable tubular structure being adapted to open said housing portion when said inflatable tubular structure moves from said stored position to said deployed position.

8. Apparatus as defined in claim 6, wherein the side door is a rear side door of the vehicle, said first location being located on the rear side door adjacent a B pillar of the vehicle, said second location being located on the rear side door adjacent a C pillar of the vehicle.

9. Apparatus as defined in claim 6, wherein said inflatable tubular structure further comprises an inflatable bladder constructed of a gas impermeable material, said outer shell surrounding said inflatable bladder.

\* \* \* \* \*